Oct. 27, 1936.  H. L. KUTTER  2,059,184

METHOD OF MAKING PAPERBOARD

Filed June 16, 1934

Inventor
Herman L. Kutter
By
Maréchal & Noe
Attorney

Patented Oct. 27, 1936

2,059,184

UNITED STATES PATENT OFFICE 2,059,184

METHOD OF MAKING PAPERBOARD

Herman L. Kutter, Hamilton, Ohio, assignor to The Black-Clawson Company, Hamilton, Ohio, a corporation of Ohio Application June 16, 1934, Serial No. 730,858

5 Claims. (Cl. 92—42)

This invention relates to the manufacture of paperboard, and more particularly to the manufacture of paperboard on a rotatable cylinder mold machine.

One object of the invention resides in the method of making paperboard on a cylinder machine at unusually high speed production and in which the paper board is made from stock having consistencies very much less than the stock consistencies ordinarily employed in such machines.

Another object of the invention resides in the method of making paper board on a cylinder machine from stock of unusually low consistencies, producing a board sheet of greatly improved quality.

Another object of the invention resides in the method of making paperboard in which stock at very low consistency is supplied to a cylinder mold vat greatly in excess of the rate of flow of white water through the cylinder mold, there being provision for withdrawing white water from the mold at a rate far in excess of the usual rate, and for recirculating the excess stock.

Other objects and advantages will be apparent from the following description, the appended claims and the accompanying drawing, in which,—

In the manufacture of paper board on a cylinder mold machine it has been the practice to use comparatively thick paper stock, stock of about 1% or .75% consistency. This stock is supplied to the inlet side of a cylinder mold machine so that as the cylinder mold rotates the water flows through the cylinder mold and this "white water" as it is termed, is withdrawn at the ends of the mold, the fibers remaining on the surface of the mold being taken off at the top of the mold. In accordance with customary practice, the rate at which the stock is supplied to the cylinder mold machine substantially corresponds to the rate of flow of the white water, which has, in the past, been less than 1000 gallons per minute for a mold 100" in length. It has been found that when the usual practice is followed in making board of .016" thickness the speed of production is less than 250' per minute, and if it is attempted to rotate the cylinder mold at a greater peripheral speed with stock of from say 1% to ¾% consistency, a sufficiently thick formation or deposit of the fibers could not be obtained with satisfactory formation.

In accordance with the present invention, the stock is supplied to the vat of the cylinder mold machine at consistencies very much less than the usual practice, the stock being supplied at a point adjacent the down turning side of the mold at consistencies less than .4% and preferably at a consistency of from .07% to .3% depending upon the thickness and speed of the board. The rate at which this low consistency stock is supplied to the machine is very much in excess of the rate of flow of white water through the cylinder mold so as to provide a large amount of stock in excess of the amount required by the mold. This large excess amount of stock is removed from the machine and recirculated back to the inlet side of the vat. A large capacity pump is provided for handling the overflowing excess stock and for returning it back to the mix box from which the stock flows to the cylinder machine vat. The capacity of the pump for handling the white water is very much larger than the capacity of the white water pumps ordinarily employed in board machines, a much greater quantity of white water being handled in accordance with this invention.

Figures 1, 2:
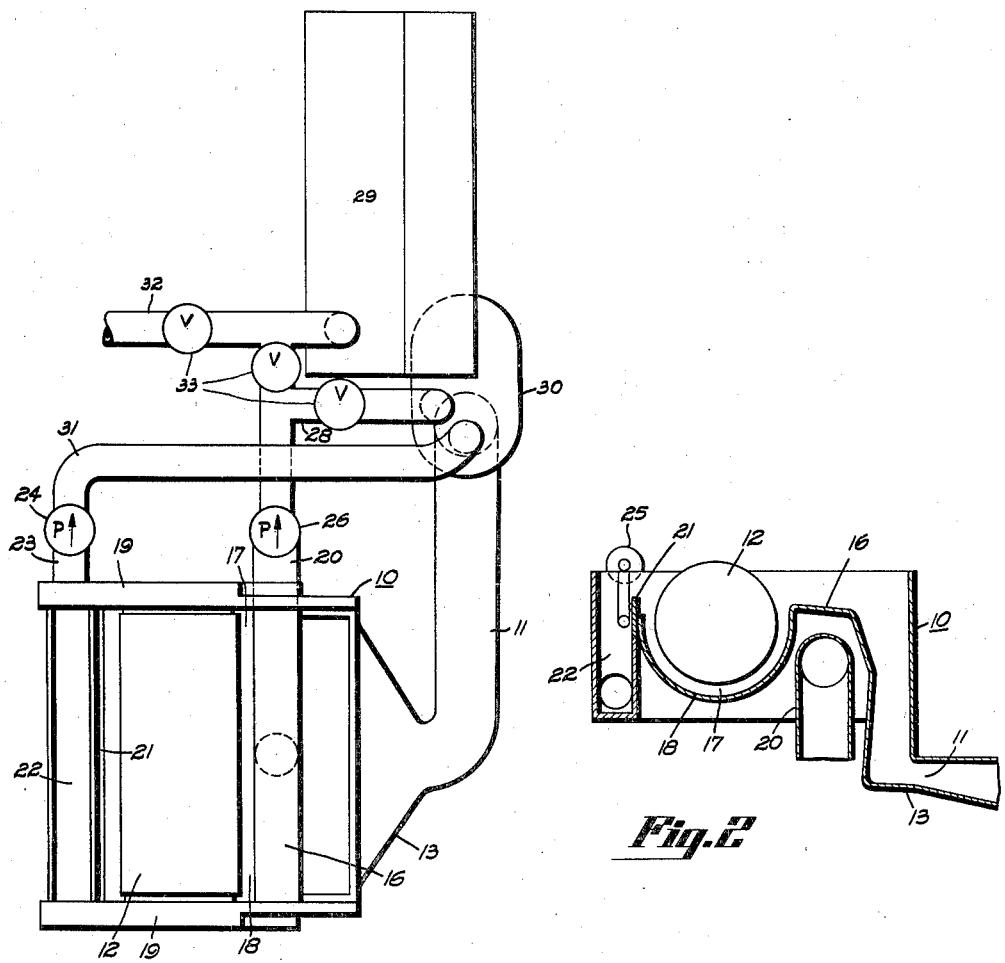
Fig. 1 is a partly diagrammatic plan view of a paper board cylinder machine embodying the present invention.
Fig. 2 is a sectional view of the machine.
Figure 3:
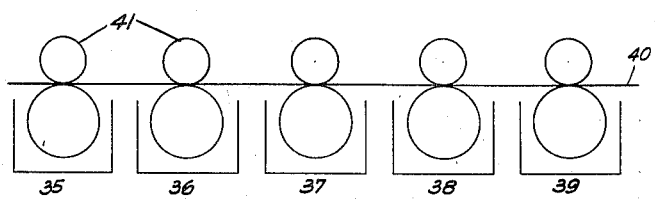
Fig. 3 is a diagrammatic view of a series of cylinder mold units cooperating in the production of a thick board sheet in accordance with this invention.

Referring more particularly to the drawing in which a preferred embodiment of the invention has been shown, 10 designates a vat having a stock supply passage 11 of large capacity adapted for handling a large flow of stock. As shown, the end of the pipe or passage 11 gradually tapers or flares from a circular formation to a very wide passage 13 which is substantially the full length of the vat so that a smooth even flow to the point of formation in the vat will be obtained. Rotatably supported in the vat 10 is the foraminous rotatable cylinder mold 12 adapted to rotate at any desired speed. The low consistency stock supplied through the passage 11 flows over an inlet wall 16 into a substantially cylindrical chamber 17 provided between the outer side of the cylinder mold and a wall 18 of the vat, the stock being supplied to the down turning side of the cylinder mold, as shown in Fig. 2. The vat is provided at opposite ends with chambers 19 which are connected together and to the white water outlet pipe 20 so that the water which flows through the openings in the forming screen and through the very large and substantially unobstructed openings at the ends of the mold can be removed.

Opposite the inlet side of the vat is a dam or overflow surface 21, preferably adjustable as to height by means of a suitable control device 25, and so arranged as to provide a large overflow of stock into the chamber 22 which is connected by a pipe 23 to a stock pump 24.

The height of the overflow dam 21 is so coordinated with the speed of movement of the cylinder mold and with the rate of stock supply to the vat as to provide a large quantity of stock flow over the dam 21. The amount of overflow is very much in excess of that required to merely remove lumps or masses of stock at the upturning side of the mold and may be about as large or even much larger than the quantity of white water flowing from the cylinder mold through the pipe 20. The white water taken from the cylinder mold is pumped from the pipe 20 by pumping means 26, of very large capacity, so as to adequately handle the very large amounts of white water that are obtained from the cylinder mold. The pump 24 is also of very large capacity so as to adequately handle the unusually large amounts of excess or overflowing stock. In a machine having a cylinder mold of 100" length, operated at a peripheral speed of say 100' to 400' per minute, the pump 26 has a capacity in excess of 1500 gallons per minute and the two pumps 24 and 26 may be centrifugal pumps of such capacity as to provide a total flow in excess of 3000 gallons per minute, preferably from 3000 to 4000 gallons per minute and of correspondingly larger capacity for a greater length of mold. Both pumps, as will be apparent, are very much larger than the white water pump ordinarily employed which has been of a capacity to handle only 1000 gallons or less per minute in a machine having a cylinder mold of 100" length.

The white water withdrawn from the cylinder mold is forced by the pump 26 through a pipe 28 back to the screen 29, the screen being connected to the mix box 30 and furnishing the mix box with stock of low consistency. The mix box 30 is provided at a suitable position so as to supply the stock by gravity through the supply passage 11 to the vat. The pump 24, which handles the excess stock, is connected to a pipe 31 which discharges into the mix box 30 so that the excess stock flowing through the vat, which is at about the same consistency as the stock supplied to the vat, is recirculated through the mix box back to the inlet side of the vat. Additional quantities of stock are supplied to the screen 29 through a pipe 32 which, as shown, is connected with pipe 28, suitable supply control valves 33 serving to control the flow as required through the several passages to the mix box and screen.

In making a board sheet about .016" in thickness, four or more vats or units such as the units 35, 36, 37, 38 and 39 are employed, sheets being taken from the upper side of each of the cylinder molds and applied to one another on a felt 40 which passes between the cylinder molds and the upper pressure rolls 41 of the various units. The board is then supplied through the press rolls and the driers.

In the manufacture of paper board in accordance with this invention the consistency of the stock employed will vary in accordance with the speed of production and the thickness of the sheet desired. For example the consistencies given just below at the left may be employed:

| Stock consistency | Board grade | Number of vats | Feet per minute | Gallons per minute supplied to a vat for 100" mold |
|---|---|---|---|---|
| .25% | .016" | 5 | 400 | 3200-4000 |
| .15% | .016" | 5 | 233 | 3600 |
| .14% | .016" | 7 | 400 | 4000 |
| .09% | .016" | 7 | 233 | 4000 |
| .25% | .030" | 5 | 210 | 2800-3600 |
| .12% | .030" | 5 | 104 | 3200 |
| .15% | .030" | 7 | 210 | 3600 |
| .07% | .030" | 7 | 104 | 3600 |

In conventional constructions as used in the past the gallons per minute in making .030" board with five vats would be about 720 per 100" cylinder mold length and stock of about .95% consistency would be used for a desired speed of about 210' per minute.

It has been found that not only can a comparatively thick sheet be produced at a greater speed and by employing stock of very thin consistency as compared with the usual practice, but in addition the sheet produced in accordance with this invention, either at high speeds or at comparatively low speeds has a much better formation, the fibers being more intimately interlaced to provide a higher resistance to tear in line with the direction of travel of the sheet as well as transversely to the direction of the travel. The sheet is much smoother and more regularly formed, since thick and irregular masses of stock are not deposited at the upturning side of the mold.

While the method herein described constitutes a preferred embodiment of the invention, it is to be understood that the invention is not limited to this precise method, and that changes may be made therein without departing from the scope of the invention which is defined in the appended claims.

What is claimed is:

1. The method of making paper board comprising supplying stock at a consistency less than .4% to the down turning side of a rotatable cylinder mold at a rate greatly in excess of the rate of flow of the white water through the mold, removing the white water from the mold at a rate in excess of 1000 gallons per minutes per 100" cylinder mold length and recirculating it back to the cylinder mold, continuously removing the excess stock at the up turning side of the mold at a rate in excess of 1000 gallons per minute per 100" cylinder mold length and recirculating it back to the cylinder mold, and controlling the amount of overflow of excess stock and coordinating the amount of overflow with the speed of rotation of the mold to provide a speed of flow of stock adjacent the mold in the vat commensurate with the speed of travel of the mold.

2. The method of making paper board comprising supplying stock at a consistency less than .4% to the down turning side of a rotatable cylinder mold at a rate greatly in excess of the rate of flow of the white water through the mold, removing the white water from the mold at a rate in excess of 1000 gallons per minute per 100" cylinder mold length and pumping it back to the cylinder mold, continuously removing the excess stock at the up turning side of the mold at a rate in excess of 1000 gallons per minute per 100" cylinder mold length and pumping it back to the cylinder mold, causing the rotation of the cylinder mold at a rate in excess of 250 feet per minute and regulating the amount of overflow of excess stock in accordance with the speed of rotation of the mold to provide a rapid rate of travel of the stock adjacent the mold in the vat.

3. The method of making paper board comprising supplying stock at a consistency less than .4% to the down-turning side of a rotatable cylinder mold at a rate greatly in excess of the rate of flow of white water through the mold to provide a rapid rate of travel of the stock adjacent the mold in the vat, removing the white water from the mold at a rate greater than 1000 gallons per minute per 100 inch cylinder mold length, continuously removing the excess stock at the upturning side of the mold, and recirculating the white water with the excess stock.

4. The method of making paper board on a cylinder mold machine which comprises supplying stock in large quantities at a consistency less than .4% to the cylinder mold vat at the downturning side of the cylinder mold at a rate greatly in excess of the rate of flow of white water through the mold and at a rate greatly in excess of the flow of excess stock from the vat, to provide a rapid rate of travel of the stock adjacent the mold in the vat, removing white water from the mold at a rate greater than 1000 gallons per minute per 100 inch cylinder mold length, and recirculating it back to the cylinder mold, and continuously removing the excess stock from the vat at a rate greater than 1000 gallons per minute per 100 inch cylinder mold length, and recirculating it back to the cylinder mold.

5. The method of making paper board comprising supplying stock at a consistency less than .4% to one side of a cylinder mold at a rate greatly in excess of the rate of flow of white water through the mold to provide a rapid rate of travel of the stock adjacent the mold in the vat, removing excess stock from the vat at the other side of the cylinder mold, removing white water from the cylinder mold at a rate greater than 1000 gallons per minute per 100 inch cylinder mold length, recirculating the white water and the excess stock back to the cylinder mold, and coordinating the amount of white water flow and excess stock flow with the speed of rotation of the mold to provide an excess stock flow which is substantially as large as the flow of white water from the mold.

HERMAN L. KUTTER.